(12) United States Patent
Kim et al.

(10) Patent No.: US 7,939,167 B2
(45) Date of Patent: May 10, 2011

(54) RESIN COMPOSITION

(75) Inventors: Sung Jun Kim, Uiwang-si (KR); Young Sik Ryu, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/648,368

(22) Filed: Dec. 29, 2009

(65) Prior Publication Data

US 2010/0163795 A1    Jul. 1, 2010

(51) Int. Cl.
*B32B 15/04* (2006.01)

(52) U.S. Cl. ............... 428/293.1; 252/511; 252/503; 428/297.4; 524/440; 524/495; 524/496

(58) Field of Classification Search ........... 428/293.1, 428/297.4, 299.1, 299.4, 301.1; 524/440, 524/495, 496; 252/503, 511, 518.1
See application file for complete search history.

(56) References Cited

U.S. PATENT DOCUMENTS

| | | | |
|---|---|---|---|
| 4,508,640 A * | 4/1985 | Kanda et al. | 252/503 |
| 4,528,213 A * | 7/1985 | Nelson et al. | 427/105 |
| 5,001,561 A * | 3/1991 | Haskell et al. | 375/240.02 |
| 5,399,295 A * | 3/1995 | Gamble et al. | 252/511 |
| 6,153,683 A | 11/2000 | Enomoto | |
| 7,588,700 B2 * | 9/2009 | Kwon et al. | 252/503 |
| 2007/0018142 A1 | 1/2007 | Kwon et al. | |
| 2010/0163795 A1 * | 7/2010 | Kim et al. | 252/299.6 |

FOREIGN PATENT DOCUMENTS

| | | |
|---|---|---|
| EP | 0185783 A1 | 7/1986 |
| JP | 2006-022130 A | 1/2006 |
| WO | 2005/038824 A1 | 4/2005 |

OTHER PUBLICATIONS

European Search Report in counterpart European Patent Application No. 09180952, dated Feb. 4, 2010.

* cited by examiner

*Primary Examiner* — N. Edwards
(74) *Attorney, Agent, or Firm* — Summa, Additon & Ashe, P.A.

(57) ABSTRACT

The present invention provides a resin composition comprising a thermoplastic resin (A), an inorganic compound having a volume resistance of less than about $10^{-3}$ Ω·m and relative permeability of more than about 5,000 (B) and fiber filler (C). The resin composition of the present invention can have high impact strength and high electrical conductivity, and high electromagnetic interference (EMI) and radio frequency interference (RFI) shielding properties. The resin composition of the present invention can accordingly have multiple functions and can be used for electrical/electronic devices.

18 Claims, No Drawings

RESIN COMPOSITION

CROSS REFERENCE TO RELATED APPLICATIONS

This application claims priority from Korean Patent Application No. 2008-0136316, filed Dec. 30, 2008 in the Korean Intellectual Property Office, and Korean Patent Application No. 2009-131698 filed Dec. 28, 2009 in the Korean Intellectual Property Office, the disclosure of which is incorporated herein by reference in its entirety.

FIELD OF THE INVENTION

The present invention relates to a resin composition.

BACKGROUND OF THE INVENTION

With increasing miniaturization, integration, and reduced weight of electrical/electronic appliances, it is becoming increasingly necessary to make a module of inner parts. For example, both electric conductivity and mechanical strength are required for an inner frame requiring EMI/RFI shielding, and both EMI/RFI shielding and excellent appearance are required for exterior materials requiring EMI/RFI shielding. Conventionally, a combination of materials, each with a different function, have been used to provide the required different functions of the end material, but there is an increasing desire to use materials with multiple functions. Further, high productivity of materials is necessary to meet demands for mass production.

Improved electromagnetic shielding efficiency is increasingly required in the modern world because of increased exposure to electromagnetic waves emitted by highly integrated, highly efficient, and high power consumption electrical/electronic appliances, which can cause system malfunctions or damage to humans.

A traditional method of shielding electromagnetic waves uses metal material coating or plating. The electromagnetic wave shielding efficiency is high through surface reflection, because the metal material has high electric conductivity. So, even a thin layer of metal can efficiently shield electromagnetic waves.

However, metal coating and plating processes can be expensive, can have limited, productivity and can raise environmental concerns. For example, metal plating processes can include complicated steps such as degreasing, etching, neutralization, activating, promotion, metallizing, first plating, second plating and third plating.

SUMMARY OF THE INVENTION

The present invention provides a resin composition that is multifunctional and can have high impact strength, high electrical conductivity and high electromagnetic interference (EMI) and/or radio frequency interference (RFI) shielding.

The resin composition of the invention comprises a thermoplastic resin (A), an inorganic compound having a volume resistance of less than about $10^{-3}$ $\Omega \cdot m$ and a relative permeability of more than about 5,000 (B), and fiber filler (C).

The resin composition of the present invention may further comprise carbon filler (D).

The resin composition can comprise about 40 to about 80% by weight of the thermoplastic resin (A), about 3 to about 20% by weight of the inorganic compound having a volume resistance of less than about $10^{-3}$ $\Omega \cdot m$ and a relative permeability of more than about 5,000 (B), about 5 to about 40% by weight of fiber filler (C) and about 0.05 to about 10% by weight of carbon filler (D).

The present invention further provides a molded plastic article including the resin composition. The molded plastic article can be used in applications requiring high impact strength, high electrical conductivity and EMI/RFI shielding.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Conductive materials such as carbon fiber, carbon nanotubes and the like can be added to a resin, alone or mixed with a reinforcing agent, to form a composite with high impact strength and high electrical conductivity. When using conductive materials including carbon, however, other additional methods are needed to improve EMI/RFI properties. The present invention provides a resin composition having high impact strength, high electrical conductivity and excellent EMI/RFI shielding.

The present invention can improve electromagnetic wave shielding effectiveness (referred to as "S.B.") by improving inner absorption as well as electromagnetic reflection in accordance with the following formula 1 representing electromagnetic wave shielding efficiency.

$$S.B.=R+A+B \qquad [\text{formula 1}]$$

In the above formula, R is surface reflection of electromagnetic waves (electric conductivity), A is inner absorption of electromagnetic waves, and B is loss by multi-reflection.

It can be important to improve inner absorption as well as surface reflection of the components represented by formula 1, because electrical conductivity of a resin composition is lower than electrical conductivity of metal materials. Accordingly, a highly electromagnetic shielding complex resin can be prepared by increasing the A value, that is by inducing inner absorption of electromagnetic wave, and increasing the R value by lowing surface impedance (increasing electrical conductivity) to increase electromagnetic shielding efficiency of the resin composition.

Stated differently, electromagnetic shielding efficiency of a resin composition is related to inner absorption of electromagnetic waves and electrical conductivity. The inner absorption of electromagnetic waves is directly related to permeability of materials. It is noted, however, that the EMI/RFI shielding efficiency of materials having only high permeability, for example, non conductive materials such as Sendust, ferrite and the like, is insignificant. In contrast, the EMI/RFI shielding efficiency of materials having both electrical conductivity and high permeability such as mu-metal or permalloy is very high. Because these inorganic materials have good electrical conductivity and effectively absorb electromagnetic waves due to high permeability, the inorganic materials can also improve electrical conductivity by helping form electro-conductive paths in a resin composition which also uses a carbon material such as carbon fiber and carbon nanotubes.

Shielding materials made using a resin composition can be economically and efficiently manufactured by extrusion of a composite (complex) resin.

The EMI/RFI shielding resin composition with high impact strength and high electrical conductivity of the present invention may include a thermoplastic resin (A), an inorganic compound having a volume resistance of less than about $10^{-3}$ Ω·m and a relative permeability of more than 5,000 (B) and fiber filler (C).

Exemplary fiber filler (C) includes without limitation carbon fiber, glass fiber, boron fiber, amide fiber, liquid crystalline polyester fiber, and the like, and combinations thereof.

The resin composition of the invention can further comprise carbon filler (D). Exemplary carbon filler (D) includes without limitation carbon nanotubes, carbon black, carbon nanofibers, and the like, and combinations thereof.

The resin composition of the present invention may comprise about 40 to about 80% by weight of the thermoplastic resin, about 3 to about 20% by weight of the inorganic compound with electric conductivity and high permeability and about 0.05 to about 10.0% by weight of carbon filler, each based on 100% by weight of the sum total of all components.

The resin composition of the invention may be prepared by mixing the components. The thermoplastic resin can form a matrix and the resin composition may have a structure in which the fillers are dispersed in the matrix.

Each component of the present invention now will be described more fully hereinafter in the following detailed description of the invention.

(A) Thermoplastic Resin

Exemplary thermoplastic resins include without limitation polyamides; polyalkylene terephthalates such as polyethylene terephthalate and polybutylene terephthalate; polyacetals; polycarbonates; polyimides; polyphenylene oxides; polysulfones; polyphenylene sulfides; polyamide imides; polyether sulfones; liquid crystalline polymers; polyether ketones; polyether imides; polyolefins such as polypropylene and polyethylene; acrylonitrile butadiene styrene (ABS); polystyrene; syndiotactic polystyrene; and the like, and combinations thereof.

For example, the thermoplastic resin of the present invention may be a crystalline thermoplastic resin. The crystalline polymers have strong point to make electrical pass-way well than amorphous polymers because crystalline domains exclude electrically conductive materials to have higher probability to be linked for each electrically conductive material. That is to say, crystalline domains reduce movable area of electrical conductive materials in polymer matrix so they can have more chance to meet. Therefore, the crystalline thermoplastic resin can form an electro-conductive path more readily than an amorphous crystalline resin by the property of excluding fillers which are except component (A) in the resin composition of the present invention outside crystalline region during crystalline. Further, reinforcing fillers in a crystalline thermoplastic resin may more effectively improve mechanical impact strength than in a non-crystalline resin.

Exemplary crystalline thermoplastic resins may include without limitation polyamides, polyethylene terephthalate, polybutylene terephthalate, polyacetals, polyphenylene sulfides, liquid crystalline polymers, polyether ketones, polyolefins, sydiotatic polystyrene and the like and combinations thereof.

The resin composition can include the thermoplastic resin in an amount of about 40 to about 80% by weight, for example, about 60 to about 75% by weight. If the amount of the thermoplastic resin is less than about 40% by weight, it may be difficult to process the resin composition, and if the amount of the thermoplastic resin is more than about 80% by weight, it may be difficult to provide the desired physical properties of the resin composition.

(B) Inorganic Compound with Electrical Conductivity and High Permeability

The inorganic compound with electrical conductivity and high permeability may have a volume resistance of less than about $10^{-3}$ Ω·m and a relative permeability of more than about 5,000. Exemplary inorganic compounds can include without limitation nickel iron alloys such as mu-metal (which can be about 75% nickel, about 15% iron, plus copper and molybdenum), permalloy (which can be about 20% iron and about 80% nickel), and the like, and combinations thereof.

The resin composition can include the inorganic compound with electrical conductivity and high permeability in an amount of about 3 to about 20% by weight, for example, about 5 to about 15% by weight. If the amount of the inorganic compound is less than about 3% by weight, EMI/RFI shielding improvement may be insignificant. More than about 20% by weight of the inorganic compound can have a negative effect on viscosity and specific gravity of the resin composition.

(C) Fiber Filler

Exemplary fiber filler includes without limitation carbon fiber, glass fiber, boron fiber, amide fiber, liquid crystalline polyester fibers, and the like, and combinations thereof. The fiber filler (C) may have an average diameter of about 1 to about 20 μm and an average length of about 1 to about 15 mm.

Exemplary carbon fiber includes without limitation polyacrylonitrile (PAN)-based carbon fiber, pitch-based carbon fiber, and the like, and combinations thereof. The carbon fiber may have an average diameter of about 5 to about 12 μm, an average length of about 3 to about 12 mm, a volume resistance of less than about $10^{-3}$ Ω·m, and a tensile strength of more than about 100 GPa.

The glass fiber may be any conventional glass fiber used for both reducing the brittleness of the resin composition when carbon fiber only is used and improving impact strength, for example, glass fiber with high impact strength used for reinforcing physical properties can be used. In one embodiment of the present invention, the glass fiber may have an average diameter of about 8 to about 15 μm and an average length of about 2 to about 12 mm.

The fiber filler of the present invention may be more desirable when volume resistance is low and tensile strength is high, because the fiber filler can be related to electrical conductivity and high impact strength of resin composition.

The resin composition can include the fiber filler in an amount of about 5 to about 40% by weight, for example, about 10 to about 25% by weight. If the amount of the fiber filler is less than about 5% by weight, it may be difficult to obtain the desired physical properties, and if the amount of the fiber filler is more than about 40% by weight, workability may be reduced and molded articles prepared using the resin composition including more than 40% by weight of the fiber filler may be brittle even when exposed to little impact.

(D) Carbon Filler

Exemplary carbon filler includes without limitation carbon nanotubes, carbon black, carbon nanofibers, and the like, and combinations thereof. Carbon nanotubes may be used, because of their excellent electrostatic discharge (ESD) properties.

Exemplary carbon nanotubes may include without limitation single wall carbon nanotubes, double wall carbon nanotubes, multi wall carbon nanotubes, and the like, and combinations thereof. The carbon nanotube may have an average outer diameter of about 1 to about 50 nm, an average length of about 10 nm to about 20 μm and a purity of more than about 80%.

The resin composition may include the carbon filler (D) in an amount of about 0.05 to about 10.0% by weight, for example, about 0.3 to about 0.5% by weight. If the amount of the carbon filler (D) is less than about 0.05% by weight, it may be difficult to provide the desired physical properties of the resin composition, and if the amount of the carbon filler (D) is more than about 10.0% by weight, the resin composition may be difficult to process because viscosity of the resin composition can significantly increase.

In another embodiment of the present invention, the present invention provides molded articles prepared using the resin composition of the present invention. The molded articles can be prepared using any conventional molding techniques such as but not limited to extrusion, injection molding, and the like. The molded articles of the present invention may have high impact strength, high electrical conductivity and can be used in fields requiring EMI/RFI shielding. For example, the molded articles of the present invention may be used in the manufacture of various molded articles such as but not limited to display devices such as TVs and PDPs, parts of electrical/electronic appliances such as computers, cell phones and devices for office automation, inner frames and the like.

In one embodiment of the present invention, molded plastic articles according to the present invention may have an electromagnetic wave shielding efficiency of about 15 to about 50 dB, a surface resistance of about 10 to about 104Ω/□ measured according to ASTM D257, a bending strength of about 12 to about 30 GPa measured according to ASTM D790 with ¼" width, and a notched izod impact strength of about 25 to about 70 J/m measured according to ASTM D256 with ⅛" width.

The invention may be better understood by reference to the following examples which are intended for the purpose of illustration and are not to be construed as in any way limiting the scope of the present invention, which is defined in the claims appended hereto.

Example (A) Thermoplastic Resin

Polyphenylene sulfide (PPS) with a melt flow index of about 48 to about 70 g/10 min at 316° and a load of 1270 g is used as the thermoplastic resin.

(B) Inorganic Compound with Electric Conductivity and High Permeability

Permalloy which is nickel-iron alloy (Dongbu Fine Chemicals Corporation) and with a volume resistance of $10^{-7}[\Omega \cdot m]$, and a relative permeability of 10,000 is used a the inorganic compound with electrical conductivity and high permeability.

(C1) Fiber Filler

A pitch carbon fiber having a diameter of 7 μm, a length of 4 mm, a volume resistance of $10^{-5}[\Omega \cdot m]$ and a tensile strength of 200 GPa is used as the fiber filler.

(C2) Fiber Filler

Glass fiber with a diameter of 10 μm, a length of 3 mm and surface coated with a silane compatibilizer for good adhesion with PPS used as the thermoplastic resin is used as the fiber filler.

(D) Carbon Filler

A multi wall carbon nanotube having a diameter of 9.5 nm, a length of 1.5 mm, and a purity of 90% is used as the carbon filler.

Samples for measuring physical properties are prepared by using a conventional twin screw extruder and injection molding machine, after the resin compositions are prepared by mixing the above described components as set forth in table 1 to provide Examples 1 to 6 and Comparative Example 1.

EMI shielding efficiencies are measured by spectrum analyzer made by ROHDE & SCHWARZ. Surface resistances of the prepared samples are measured according to ASTM D257.

Bending strengths are measured according to ASTM D790 with ⅛" width.

Notched izod strengths are measured according to ASTM D256 with ¼" width.

The results of the measured physical properties are presented in the following Table 1.

The Examples and Comparative Example of Table 1 demonstrate that carbon fiber (C1) used as fiber filler contributes primarily to impact strength and electrical conductivity, carbon filler contributes to electrical conductivity, glass fiber (C2) contributes to impact strength and permalloy used as the inorganic compound contributes to increasing the EMI/RFI shielding property which has limited improvement by carbon fiber and carbon nanotubes.

As a result, the present invention can provide a multifunctional resin composition having high impact strength, high electrical conductivity, and good EMI/RFI shielding properties prepared by mixing an inorganic compound with an electrically conductive and high permeability fiber filler and optionally carbon filler.

TABLE 1

|  | Examples | | | | | | Comparative Example |
|---|---|---|---|---|---|---|---|
|  | 1 | 2 | 3 | 4 | 5 | 6 | 1 |
| (A) Thermoplastic resin [PPS] | 75 | 65 | 55 | 75 | 75 | 60 | 80 |
| (B) Inorganic compound with high permeability [PERMALLOY] | 5 | 15 | 5 | 5 | 5 | 5 | — |
| (C1) fiber filler | 20 | 20 | 40 | 19.5 | 18.5 | 19.5 | 20 |
| (C2) fiber filler | — | — | — | — | — | 15 | — |
| (D) CNT | — | — | — | 0.5 | 1.5 | 0.5 | — |
| EMI shielding efficiency @ 2.1 T [dB] | 27 | 38 | 38 | 30 | 32 | 25 | 11 |
| Surface resistance [Ω/□] | $7.0 \times 10^2$ | $3.5 \times 10^2$ | $2.2 \times 10^1$ | $9.0 \times 10^1$ | $1.0 \times 10^1$ | $4.0 \times 10^3$ | $9.4 \times 10^2$ |
| Bending impact strength [GPa] | 14 | 16 | 18 | 14 | 14 | 15 | 12 |
| Notched izod impact strength [J/m] | 45 | 48 | 61 | 48 | 51 | 79 | 45 |

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A resin composition comprising a thermoplastic resin (A), an inorganic compound (B) having a volume resistance of less than about $10^{-3}$ Ω·m and a relative permeability of more than about 5,000 and a fiber filler (C).

2. The resin composition of claim 1, wherein said resin composition further comprises a carbon filler (D).

3. The resin composition of claim 1, wherein said resin composition comprises about 40 to about 80% by weight of the thermoplastic resin (A), about 3 to about 20% by weight of the inorganic compound (B) having a volume resistance of less than about $10^{-3}$ Ω·m and a relative permeability of more than about 5,000, and about 5 to about 40% by weight of the fiber filler (C).

4. The resin composition of claim 3, wherein said resin composition further comprises about 0.05 to about 10.0% by weight of a carbon filler (D).

5. The resin composition of claim 1, wherein said fiber filler (C) comprises carbon fiber, glass fiber, boron fiber, amide fiber, liquid crystalline polyester fiber, or a combination thereof.

6. The resin composition of claim 2, wherein said carbon filler (D) comprises a carbon nanotube, carbon black, carbon nanofiber, or a combination thereof.

7. The resin composition of claim 1, wherein said thermoplastic resin (A) comprises polyamide, polyethylene terephthalate, polybutylene terephthalate, polyacetal, polycarbonate, polyimide, polyphenylene oxide, polysulfone, polyphenylene sulfide, polyamide imide, polyether sulfone, liquid crystalline polymer, polyether ketone, polyether imide, polyolefin, ABS resin, polystyrene, syndiotactic polystyrene, or a combination thereof.

8. The resin composition of claim 1, wherein said thermoplastic resin (A) is a crystalline thermoplastic resin.

9. The resin composition of claim 1, wherein said fiber filler (C) has an average diameter of about 1 to about 20 μm and an average length of about 1 to about 15 mm.

10. The resin composition of claim 1, wherein the fiber filler (C) is a carbon fiber having a volume resistance of less than about $10^{-3}$ Ω·m and a tensile strength of more than about 100 GPa.

11. The resin composition of claim 6, wherein said carbon nanotube has an average outer diameter of about 1 to about 50 nm and an average length of about 10 nm to about 20 μm.

12. The resin composition of claim 11, wherein said carbon nanotube comprises a single wall carbon nanotube, a double wall carbon nanotube, a multi wall carbon nanotube, or a combination thereof.

13. The resin composition of claim 1, wherein said inorganic compound comprises a nickel iron alloy.

14. The resin composition of claim 13, wherein said nickel iron alloy comprises a mu-metal, a permalloy or a combination thereof.

15. A molded plastic article prepared from the polycarbonate resin composition of claim 1.

16. The molded plastic article of claim 15, wherein said molded plastic article has an electromagnetic wave shielding efficiency of about 15 to about 50 dB.

17. The molded plastic article of claim 15, wherein said molded plastic article has a surface resistance of about 10 to about $10^4$Ω/□ measured according to ASTM D257.

18. The molded plastic article of claim 15, wherein said molded plastic article has a bending strength of about 12 to about 30 GPa measured according to ASTM D790 with ¼" width, and a notched izod impact strength of about 25 to about 70 J/m measured according to ASTM D256 with ⅛" width.

* * * * *

UNITED STATES PATENT AND TRADEMARK OFFICE
CERTIFICATE OF CORRECTION

PATENT NO. : 7,939,167 B2  
APPLICATION NO. : 12/648368  
DATED : May 10, 2011  
INVENTOR(S) : Sung Jun Kim et al.

Page 1 of 1

It is certified that error appears in the above-identified patent and that said Letters Patent is hereby corrected as shown below:

On the Title Page insert:

-- (30)    Foreign Application Priority Data

Dec. 30, 2008   (KR) ............. 10-2008-0136316  
Dec. 28, 2009   (KR) ............. 10-2009-0131698 --

Signed and Sealed this  
Thirty-first Day of January, 2012

David J. Kappos  
*Director of the United States Patent and Trademark Office*